United States Patent [19]

Vinchant

[11] Patent Number: 5,706,374

[45] Date of Patent: Jan. 6, 1998

[54] COMPACT DIGITAL OPTICAL SWITCH

[75] Inventor: Jean-Francois Vinchant, Bruyeres Le Chatel, France

[73] Assignee: Alcatel N.V., Rijswijk, Netherlands

[21] Appl. No.: 568,585

[22] Filed: Dec. 7, 1995

[30] Foreign Application Priority Data

Dec. 8, 1994 [FR] France ............... 94 14773

[51] Int. Cl.$^6$ ............................................. G02B 6/26
[52] U.S. Cl. ..................... 385/16; 385/17; 385/18; 385/20; 385/31
[58] Field of Search ............................. 385/16, 15, 17, 385/18, 22, 31, 20

[56] References Cited

U.S. PATENT DOCUMENTS 5,181,262  1/1993  van der Tol et al. ............. 385/16
5,461,684  10/1995  Vinchant et al. ................. 385/16

OTHER PUBLICATIONS

Okayama H. et al, "8*8 Ti:LiNbO/sub 3/Waveguide Digital Optical Switch Matrix", *IEICE Transactions on Communications*, Feb. 1994, Japan, vol. E77-B, No. 2, ISSN 0916-8516, pp., 204–208, XP000447112.

Vinchant et al, "InP Digital Optical Switch: Key Element for Guided-Wave Photonic Switching", *IEEE Proceedings J Optoelectronics)*, Oct. 1993, UK, vol. 140, No. 5, ISSN 0267-3932, pp. 301–307, XP 000412792

Cavailles, J. A. et al, "First Digital Optical Switch Bawed on InP/GaInAsP Double Heterostructure Waveguides", *Electronics Letters*, 25 Apr. 1991, UK, vol. 27, No. 9, ISSN 0013-5194, pp. 699–700 XP 000186217.

Okayama H. et al, "Reduction of Voltage–Length Product for Y-Branch Digital Optical Switch", *Journal of Lightwave Technology*, Feb. 1993, US, vol. 11, No. 2, ISSN 0733–8724, pp. 379–387.

Tanaka I et al, "Glass Waveguie 1*N Branching Devices", *IEICE Transations on Communications*, Sep. 1992, Japan, vol. E75-B, No. 9, ISSN 0916-8516, pp. 886–892, XP 000321324.

Primary Examiner—Phan T. H. Palmer
Attorney, Agent, or Firm—Sughrue, Mion, Zinn, Macpeak & Seas, PLLC

[57] ABSTRACT

A digital optical switch in the shape of the letter "Y" at least an input optical waveguide and first and second output optical waveguides. Each output waveguide comprises at least a first part and a second part coupled by a transition in a transition region. An applied electrical control signal commands a refractive index difference between respective first parts of the output waveguides. At least one of the output optical waveguides has in a plane containing the output waveguides a guided propagation mode width that is lower in the second part than the mode width in the first part of the respective output waveguide. In a preferred implementation, the transition is an adiabatic transition. Applications include photonic routing and optical switching matrices.

13 Claims, 11 Drawing Sheets

FIG_8
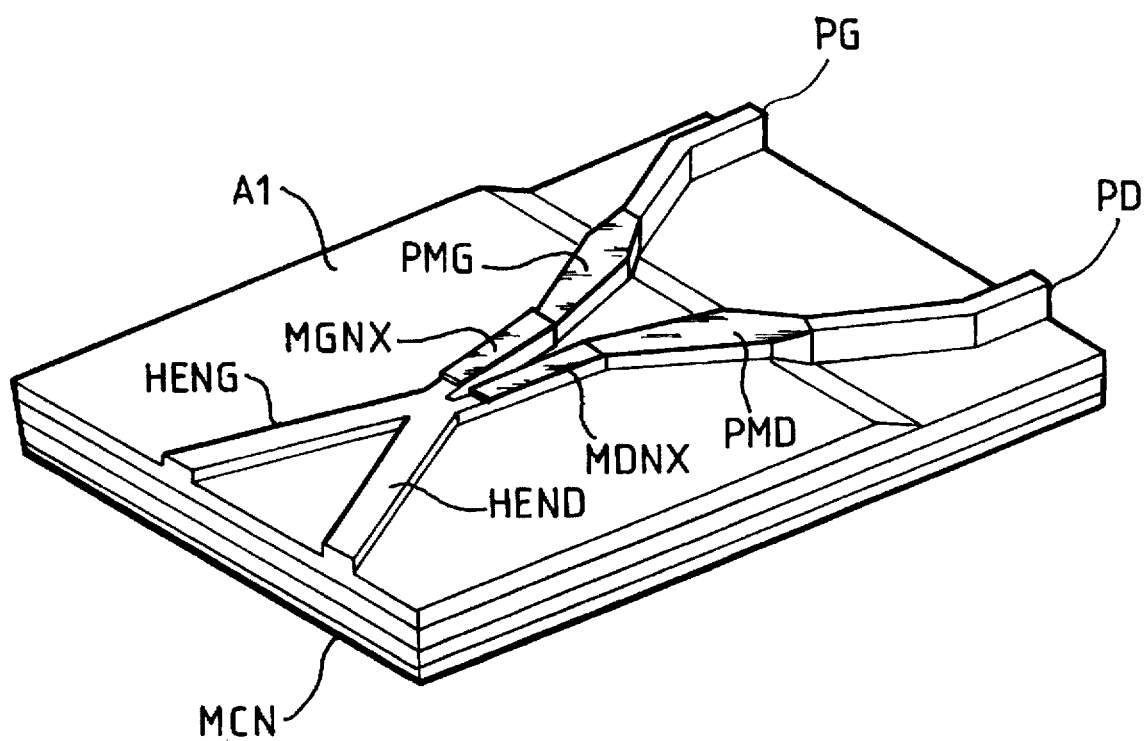

COMPACT DIGITAL OPTICAL SWITCH

BACKGROUND OF THE INVENTION

1. Field of the Invention

The field of the invention is that of digital optical switching. The invention concerns an electro-optical component for routing an optical signal between an input and one of two outputs under the influence of an applied electric voltage or an injected electric current. The input and the two outputs are optical waveguides; the digital optical switch enables routing of optical signals without photonic-electronic or electronic-photonic conversion.

2. Description of the Prior Art

The advantages of a digital optical switch (DOS) having two output branches disposed in a "Y" configuration relative to a single input are described, for example, in "Polarization and wavelength-insensitive guided wave optical switch with semiconductor Y junction", YANAGAWA, H. et al., J. Lightwave Technology, v. 8, no. 8, pp. 1192–1197 (1990).

A switch of this kind is not highly sensitive to the wavelength or polarization of the guided light. Switching is effected either by injecting current into one of the output waveguides in order to change its refractive index, with response times greater than one nanosecond, or by application of a voltage by means of an electrode disposed along the output waveguides, enabling faster switching authorizing bit rates of a few Gbit/s in optical TDMA. The person skilled in the art is familiar with examples of digital optical switches described above in many implementations intended to optimize some particular aspect of performance: minimizing the applied control voltage or current, reducing the overall size of the component, minimizing crosstalk or increasing the extinction ratio in the unused branch, improving the response time of the switch, simplifying and reducing the cost of its implementation, industrial scale fabrication and integration into a switching matrix, etc. See, for example, "Reduction of voltage-length product for Y-branch digital optical switch", OKAYAMA, H. et al., J. Lightwave Technology, vol. 11 no. 2, pp. 379–387.

U.S. patent application Ser. No. 08/297,029 now U.S. Pat. No. 5,461,684, which forms an integral part of the description of the prior art in this application, describes a Y-branch switch of this kind that is preferably implemented on an ZnP substrate using the MOCVD technique.

The above patent application concerns taking full advantage of a particular geometry of the Y-branch to obtain optimum performance. In particular, the transition region is of minimum length and the bifurcation angle is chosen to optimize extinction of the wave in the waveguide that is not selected, without compromising performance and in particular without introducing uudue insertion losses. This prior art switch provides satisfactory performance but it would be desirable to reduce its overall size and in particular its overall length.

For optimum performance, the geometry of the switch described in the above application has a bifurcation angle (relative to the main waveguide) in the order of 1°. Total extinction in the unselected branch then calls for an overall length of 2 mm to 3 mm, which appears to be too long, especially for optical switching applications using a large number for optical switching matrices (hence the preoccupation with their size).

The switch described in the above application has other advantages that it is important to retain, namely its insensitivity to the polarization of the guided light and its low control voltage.

Digital optical switches have either a single input and two output optical waveguides disposed in a "Y" or two inputs and two output optical waveguides arranged in an "X" (see "Large-angle 1.3 μm InP/InGaAsP digital optical switches with extinction ratios exceeding 20 dB", Nelson, W. H. et al., Proc. Optical Fiber Conference 1994, session TuM2, p53–54).

In the simplest case the output waveguides are identical. The active output waveguide is selected either by injecting electric current into the other, unselected output waveguide in order to reduce its refractive index or by applying an electric potential to the selected waveguide in order to increase its refractive index by the Pockels and/or Kerr opto-electronic effect.

The geometry of the coupler includes parameters such as the angle between the output waveguides, the length of the electrodes and the shape of the waveguides. These parameters are chosen to minimize the electric power dissipated, to minimize crosstalk (i.e. the presence of optical power in the unselected waveguide), and to minimize insertion losses and the overall dimensions of the component. Prior art digital optical switches are described in more detail in "InP digital optical switch: key element for guided wave photonic switching", J. F. Vinchant et al., Proc. IEEE, vol. J.140, no. 5, pp.301–307, (Oct. 1993), which forms an integral part of the description of the prior art in this application.

One object of the invention is to remedy the drawbacks of the prior art optical switches of the type described above and in particular to optimize all the parameters mentioned simultaneously. For example, one object of the invention is to reduce the overall size of the component whilst minimizing crosstalk, reducing electrical dissipation at the control electrodes and minimizing insertion losses.

SUMMARY OF THE INVENTION

To this end, the invention proposes a digital optical switch comprising an input optical waveguide and first and second output optical waveguides, said waveguides being mutually disposed at a bifurcation having the shape of the letter "Y", said first and second output waveguides each comprising at least a first part at one end of said input waveguide and a second part at one end of said first part, said first and second parts being coupled by a transition in a transition region, and means for applying an electrical control signal that commands a refractive index difference between said respective first parts of said first and second output waveguides, wherein at least one of said output optical waveguides has in a plane containing said output waveguides a guided propagation mode width that is lower in said second part than the mode width in said first part of the respective output waveguide.

In one embodiment, the switch of the invention comprises two input waveguides and two output waveguides disposed in the shape of the letter "X".

In accordance with another feature, said transition is between said first part having a refractive index $n_1$ and said second part having a refractive index $n_2 > n_1$. In one variant, said transition between said first and second parts with indices $n_1$, $n_2$ is produced by a butt joint.

In accordance with an advantageous feature, said first and second parts are coupled via an adiabatic transition.

In one specific embodiment, said adiabatic transition is formed by etching. In an advantageous embodiment, the depth of said etching is greater in the region of said second part than in the region of said first part of said output waveguides.

In accordance with an advantageous feature, said first and second parts have respective physical dimensions transverse to the direction of propagation of light in said waveguides referred to as their height and their width and said height of said first parts is less than said height of said second parts. In accordance with another advantageous feature, said width of said second parts is less than said width of said first parts.

In another specific embodiment, said adiabatic transition is between said first parts formed by a ridge technique and said second parts formed by a buried heterostructure technique. In one variant, said first and second parts are both formed by a buried heterostructure technique.

In an advantageous embodiment, at least said first parts are formed by a multiple quantum well (MQW) technique.

The invention also proposes a photonic switching or routing matrix comprising a plurality of DOS each having any of the features stated hereinabove.

The digital optical switch of the invention and its various variants have the required features, namely: a small overall size, which can be less than 1 mm, a high extinction ratio in the unselected branch and low insertion losses. The switch of the invention also retains the features of conventional DOS, namely low electrical dissipation at the control electrodes that control the refractive index under the electrode, either by injection of current or by application of a control voltage, and low sensitivity to the polarization and to the wavelength of the guided light.

If an efficient material is used for the active areas under the electrodes, for example quantum wells, the small size of the electrodes, a length in the order of 100 μm, for example, enables the switch to operate at high bit rates (≧10 Gbit/s) using voltage control.

Other features and advantages of the invention will emerge from the following detailed description and the appended drawings.

BRIEF DESCRIPTION OF THE DRAWINGS

FIG. 8 shows another embodiment of the digital optical switch according to the present invention.

DETAILED DESCRIPTION OF THE PREFERRED EMBODIMENTS

The various figures show non-limiting embodiments of a digital optical switch in accordance with the invention and a few of its main features. The same reference symbols refer to the same components in all the figures. For reasons of clarity, the drawings are not all to the same scale.

Figure 1:
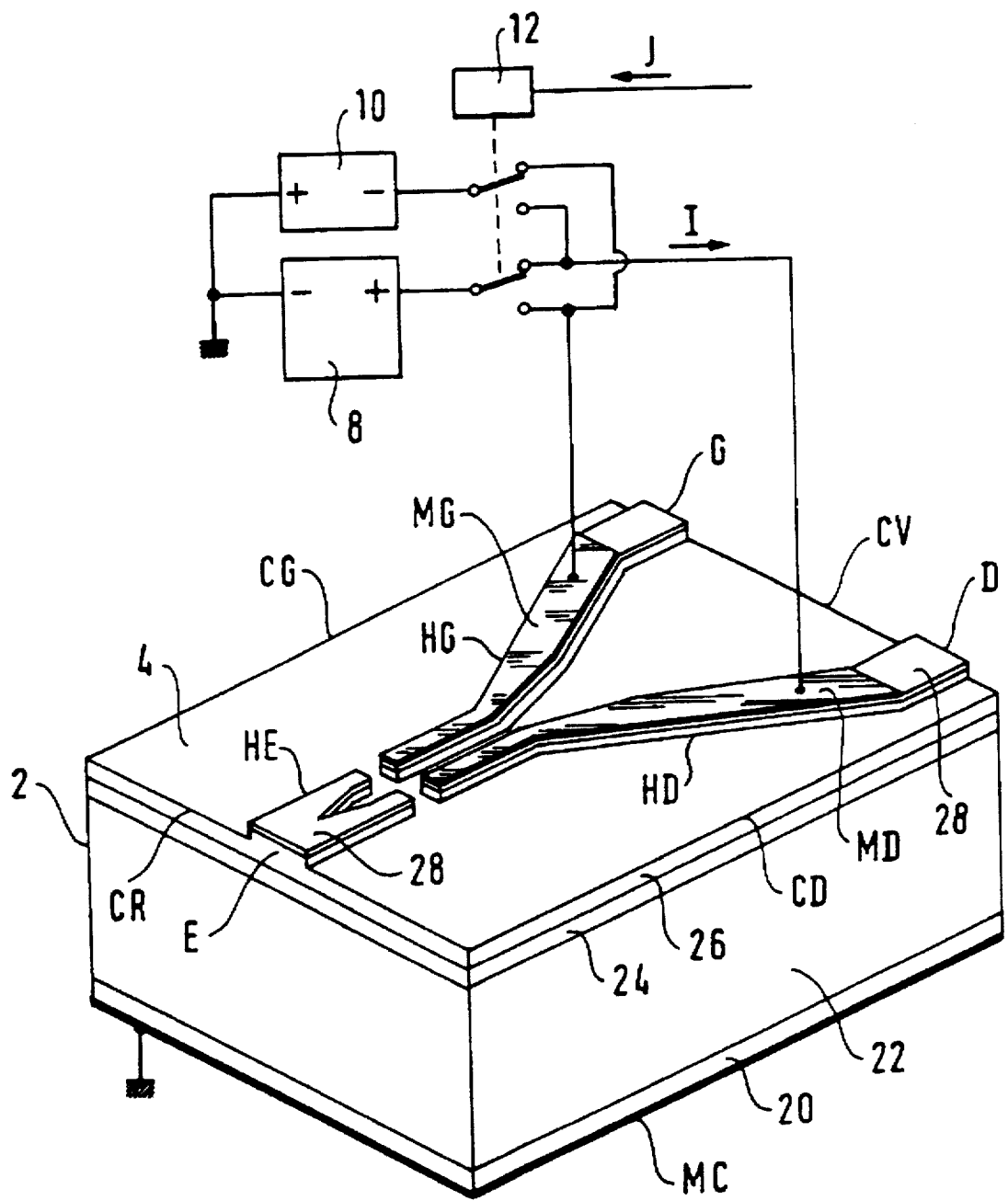
FIGS. 1 and 2 are respectively a perspective view and a plan view of a prior art DOS as described, for example, in U.S. patent application Ser. No. 08/297,029 now U.S. Pat. No. 5,461,684.

FIG. 1 is a perspective view of a prior art DOS. A first component of this prior art DOS is a wafer 2 made from a material such as a monocrystalline semiconductor material, for example, that is transparent to a light wave to be processed, for example an infrared light wave. A refractive index of at least one layer of this material is sensitive to electrical action, for example variation of the density of charge carriers injected into that layer by an electric current or extracted therefrom by an electric voltage. The wafer extends in a guide plane 4 which is horizontal, for example. It includes a vertical succession of horizontal layers, as follows:

A highly doped bottom contact layer 20 having a first type of conductivity, for example the n type conductivity, in contact with a common electrode MC.

An n type, for example, substrate 22.

A guide layer 24 having a refractive index greater than that of this substrate.

A cladding layer 26 having a refractive index lower than that of this guide layer. This cladding layer has its full thickness in the region of three optical waveguides constituting an input waveguide HE and two output waveguides HD and HG. This layer is thinner outside this region. It has on top of it a medium having a refractive index lower than that of this layer and typically consisting of the atmosphere, and as a result of this lower refractive index the light wave is guided by these waveguides.

Finally, a highly doped top contact layer 28 having a second type of conductivity opposite the first type, i.e. the p type conductivity, for example. This top contact layer 28 is present only where the cladding layer 26 has its full thickness. Right and left electrodes MD and MG are formed on the top contact layer 28 in the region of the output waveguides HD and HG.

In the guide plane 4 the wafer 2 has:

a rear side CR, a front side CV, an axis OX (see FIG. 2) with abscissae x1 . . . x9 increasing from this rear side to this front side in a longitudinal direction defined by this axis, a right side CD, a left side CG, and a transverse direction DT joining this right side and this left side.

Areas Z1 . . . Z8 are each defined by one of said abscissae or between two of said abscissae.

The switch includes:

an input E located on said rear side to receive said light wave, two outputs D, G situated on said front side to output said light wave, these two outputs constituting a right output D to the right of said axis and a left output G to the left of said axis, and said waveguides HE, HD, HG formed in the guide plane 4 to guide this wave in monomode fashion and on command from this input to one or both of the two outputs.

Each of the waveguides is a linear ribbon. It has a width at each point. It also has right and left edges in this guide plane. Its width constitutes a normal waveguide width W when it is not much less than, for example between 50% of and 100% of, a multimode waveguide width above which this waveguide could guide said light wave in multimode fashion. Each edge has in each area the general shape of a straight line segment associated with that edge. Some of these edges are parallel to the longitudinal direction of the switch. Other edges are inclined to that direction.

The waveguides include:

an input waveguide HE extending along the axis OX with a normal waveguide width between a rear end constituting said input E and a front end HEV of this waveguide, this front end having an abscissa x3, this input waveguide having right and left edges HED and HEG, and, two output waveguides, a right output waveguide HD and a left output waveguide HG, optically continuous with the input waveguide on the right and on the left of the axis OX, from an output waveguide start abscissa x4 at least equal to the input waveguide front end abscissa x3 to right and left outputs D and G, respectively.

Each of the right and left output waveguides has the following successive segments from the rear to the front:

A right receiver segment SD1 (or left receiver segment SG1) corresponding to this output waveguide and extending in said longitudinal direction. Each of these receiver segments occupies a commanded receive area Z5 extending from said output waveguide start abscissa x4 to a divergence abscissa x5. Its width is less than 50% of said normal waveguide width W. It also has a right outside edge SD1D (or left outside edge SG1G) associated with the same straight line as the right edge HED (or the left edge HEG) of the input waveguide HE. Finally, it has a left inside edge SD1G (or right inside edge SG1D) facing the inside edge of the receive segment of the other output waveguide (the left or right output waveguide, respectively). A gap 6 is left between the two inside edges of these two receive segments. This gap has a constant width constituting a normal gap width LN.

Finally, right divergent segments SD2 . . . SD4 (or left divergent segments SG2 . . . SG4) corresponding to said right or left output waveguide and receive segment. They extend in succession towards the front and towards the right side (or towards the left side, respectively) from said divergence abscissa. Each right divergent segment (or left divergent segment SG4) has a right outside edge (or left outside edge SG4G) and a left inside edge (or right inside edge SG4D), respectively. The successive divergent segments of each right (or left) output waveguide constitute a right output segment SD4 (or left output segment SG4), respectively, in an output area Z8 located at abscissae x8, x9 substantially greater than the divergence abscissa x5. The straight lines associated with the outside and inside edges SD4D, SD4G, SG4D, SG4G of each output segment have the same inclination constituting a normal output segment inclination A. They meet the straight lines associated with the outside and inside edges of the receive segment corresponding to external and internal meeting abscise x5 and x7, respectively. In the present example the outside meeting abscissa is the divergence abscissa x5. The width of these output segments is said normal width W.

The set of input and output waveguides constitutes a guide structure for the light wave to be processed extending from the rear side CR to the side CV and having a total width WT in the transverse direction DT. This total width initially constitutes said normal waveguide width W in the areas Z1 . . . Z5 occupied by the input waveguide HE and said receive segments SD1 and SG1 of the output waveguides. It then increases progressively towards the front from the divergence abscissa x5.

For guiding said light wave this guide structure has a guide gap 6 extending along the OX axis and having a width in the transverse direction DT. This guide gap 6 is present at the abscissae x2 . . . x9 which are greater than a gap start abscissa x2 that is not greater than said output waveguide start abscissa x4. This gap is absent, however, at the abscissae x0 less than this gap start abscissa. A gap width LH is defined at each abscissa. It is equal to the width of the guide gap or is a null width according to whether the guide gap is present or absent at the abscissa in question. The gap width is therefore a null width in an input area Z1 occupied by the input waveguide HE short of the gap start abscissa x2. It is then equal to the normal gap width LN in the commanded receive area Z5. It finally increases in the output area Z8 to decouple progressively two modes of said light wave that can be guided by the respective output waveguides so that beyond a front end of this output area these two output waveguides cease to cooperate to constitute a guide structure.

A gap widening rate can be defined for each abscissa as a rate of increase of the width of the gap as a function of the abscissa. This rate is therefore a null rate where this gap width remains a null width or remains equal to the normal gap width. In the output area Z8 this rate is defined by the normal inclinations and then constitutes a normal gap widening rate. In particular, the inclinations of the two output waveguides are the same, these two output waveguides being symmetrical about the axis OX and being at the same angle A to that axis. The normal gap widening rate then has the value tan2A.

The arrangements described above produce two transition areas, namely an input area and an output area, in which the gap widening rate as defined above is subject to variations:

The input transition area Z2, Z3, Z4 includes the gap start abscissa x2 and the output waveguide start abscissa x4. In this area gap widening rate variations (increases and decreases) change the gap width from a value that first remains a null value in the input area Z1 to a value that then remains equal to the normal gap width LN in the commanded receive area Z5.

The output transition area Z7 includes the internal meeting abscissa x7. It causes the gap widening rate to change from a value that is initially a null value near the commanded receive area Z5 to a final value equal to the normal gap widening rate in the output area Z8.

The right electrode MD and the left electrode MG are respectively formed on the right and left output waveguides HD and HG from their receive segments SD1 and SG1. They continue at least as far as a rear end of the output area Z8 and preferably, and as shown here, as far as a front end x9 of these areas. They enable selective application in these waveguides of the electrical actions required to cause the required local modification of the refractive indices of these waveguides.

The switch finally includes an electrical supply 8, 10, 12 receiving a control signal J and in response thereto applying an electric signal I to the electrodes so that said local modifications of the refractive indices optically couple the input waveguide HE to said right output waveguide HD and/or to the left output waveguide HG, depending on the value of the control signal.

More particularly, in the example given, the control signal J controls an electric switch 12. The latter activates one of the right and left electrodes. To do so it connects it to a supply 8 at a positive potential relative to ground (the common electrode MC). A current then flows through the wafer 2 from the activated electrode and injects charge carriers into the guide layer 24.

The electrode that is not activated is connected to a supply 10 at a negative potential in order to deplete the carriers under that electrode. The refractive index is therefore reduced under the activated electrode and the light wave to be treated received in the waveguide HE passes into the output waveguide having the higher index.

The normal gap width LN previously mentioned is chosen to provide mutual electrical isolation of the right and left electrodes MD and MG in the commanded receive area Z5.

In the prior art switch, at least one of said two transition areas is adapted in a way that locally modifies the guide gap width, as compared to that previously described, to limit the maximal value assumed by the gap widening rate in this area. These adaptations can advantageously take one or other of two forms, preferably both.

Figure 2:
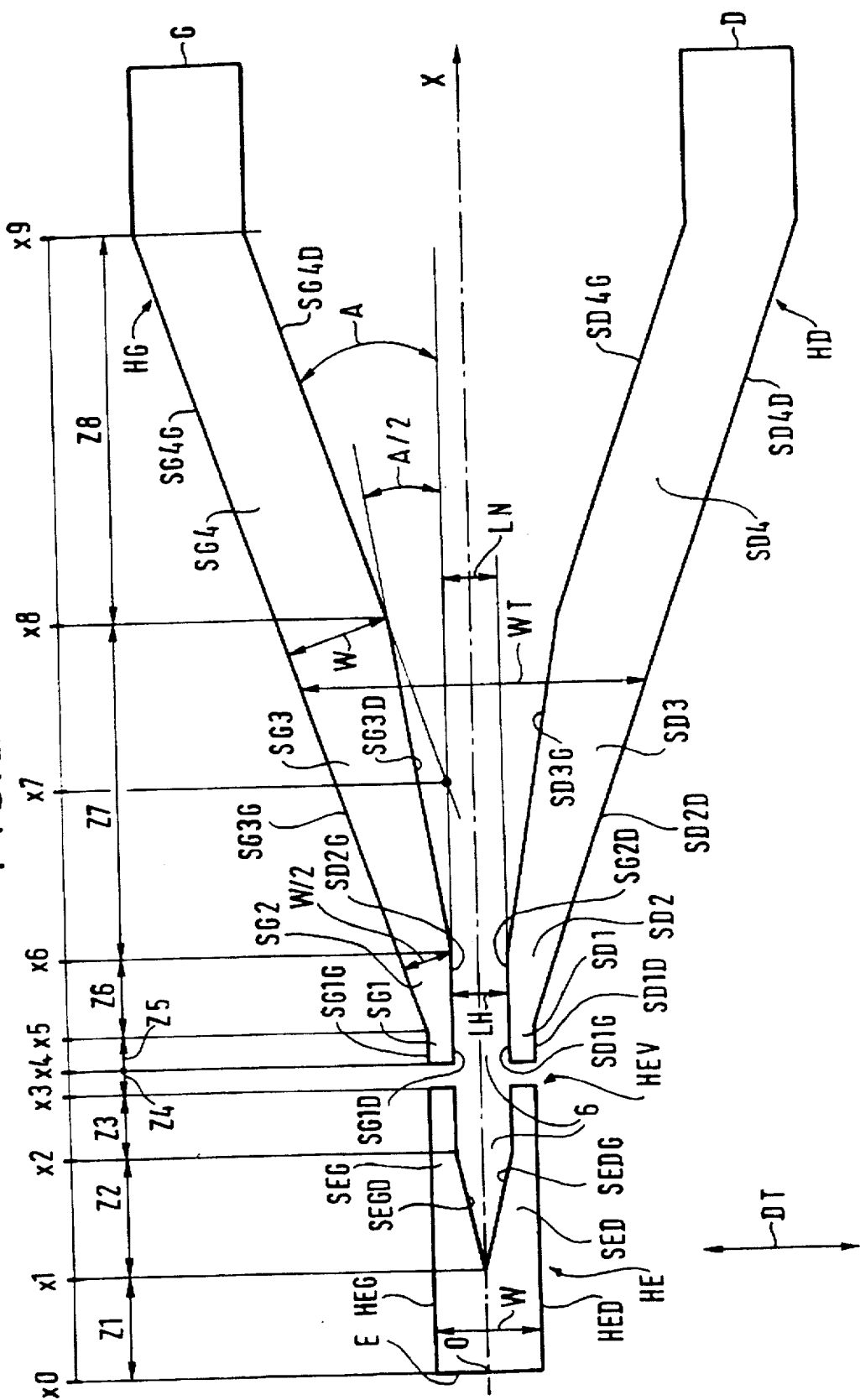

The prior art switch shown in FIGS. 1 and 2 has an overall length in the order of 3 mm, which is considered excessive for photonic routing systems using switching matrices. The length of the prior art DOS could be reduced by increasing the angle between the two branches which is typically less than 1° in the example described. However, increasing the angle between the two branches increases the insertion losses, which cannot be tolerated in a switching matrix based routing system in which a greater or lesser number of DOS are connected in cascade.

On the other hand, the extinction ratio in the unselected branch of this prior art DOS is high (>30 dB).

In other words, the crosstalk is low because of the shape of the waveguides HG and HD in the transition area Z7 where the aim is rapidly to increase the lateral distance between the two waveguides (HD, HG) immediately on leaving the switching region (from x6 rather than x7), without commensurately increasing the angle between the output waveguides and, consequently, the insertion losses.

Figure 3:
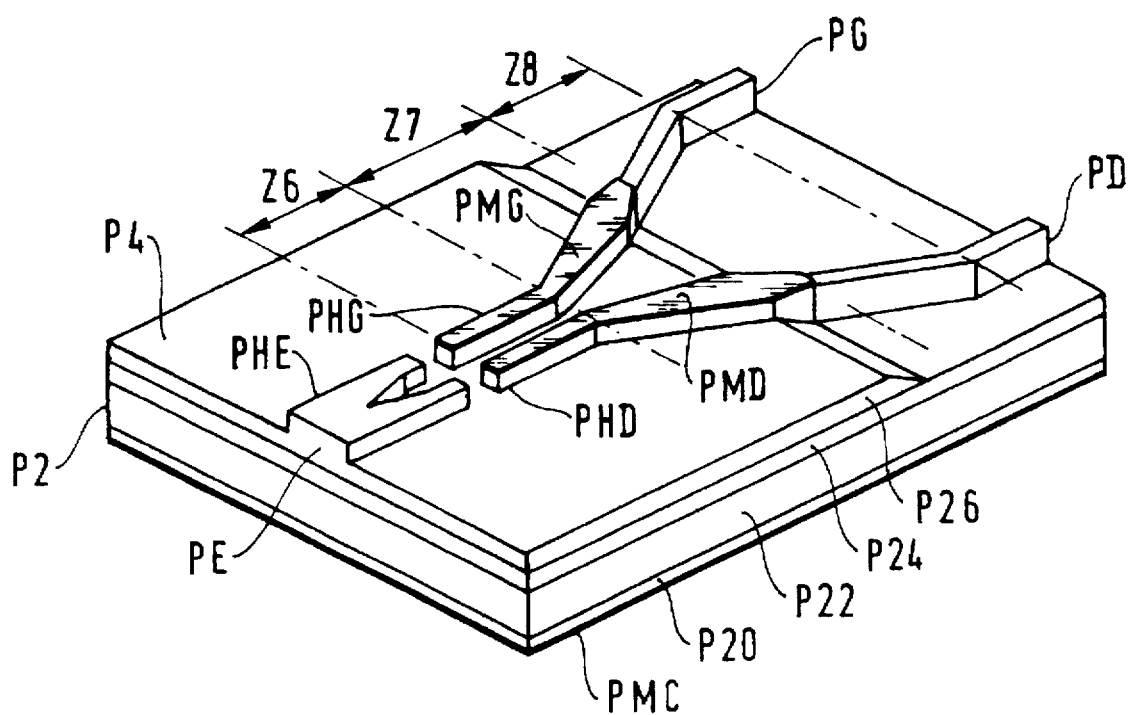
FIG. 3 shows one embodiment of the digital optical switch of the invention.

FIG. 3 is a perspective view of one embodiment of a DOS in accordance with the invention.

This switch of the invention has several components with the same function as the corresponding components in the prior art switches, such as those shown in FIGS. 1 and 2, for example, these components being referred to hereinafter as "common components".

Where a common component of the prior art switch is shown in FIG. 3, it is denoted by the letter P followed by the reference symbols designating the corresponding common component of the prior art switch as described hereinabove, and it is described only briefly insofar as it forms a component of FIG. 3.

Like the prior art DOS shown in FIGS. 1 and 2, the DOS of the invention comprises a monocrystalline semiconductor wafer 2 of InP, for example, or ternary or quaternary substances containing these elements. The wafer 2 extends in a guide plane 4 which is horizontal in the figure to facilitate the following description.

Of course, this horizontal disposition is arbitrary and adopted exclusively for purposes of description; the DOS operates in exactly the same manner independently of its orientation in space. Given the horizontal disposition of the DOS in this figure, the DOS comprises a vertical succession of horizontal layers comprising:

a bottom contact layer P20 in contact with a common electrode PMC;

a substrate P22;

a guide layer P24;

a cladding layer P26;

a top contact layer P28.

In the FIG. 3 embodiment, the various common components listed above have the same functions as in the prior art DOS shown in FIGS. 1 and 2. Accordingly, their main features are similar if not identical, in particular their implementation, their composition, their doping and their relative refractive indices. The geometrical parameters are the same and therefore are not shown in FIG. 3, but the values of these parameters are not necessarily the same.

With reference to the features of the invention that are not known from the prior art, as mentioned above, said first and second output optical waveguides (PHG, PHD) each respectively comprise at least a first part (in area Z6) and a second part (in area Z8), these first and second parts being coupled by a transition (in area Z7), characterized in that at least one of said output waveguides (PHG, PHD) has a guided propagation mode width in the guide plane 4 which is smaller in said second part (area Z8) than in said first part (area Z6) of the respective output waveguide (PHG, PHD).

In other words, the mode is more strongly confined in the waveguides of said second part (area 8) than in the waveguide of said first part (area 6) of the output waveguides (PHG, PHD).

This can be achieved in various ways, one of which is shown by way of example in FIG. 3, where a higher refractive index step in said second part (area 8) is achieved by deeper etching of the ridge in this second part. The ridge width is reduced in this second part in order to retain monomode propagation in the guide structure.

The transition region (area Z7) is advantageously such that there is adiabatic variation of the confinement between said first part having a low confinement and said second part having a high confinement. In the FIG. 3 example, this adiabatic transition is provided in the transition area (Z7) by an adiabatic variation of the depth of etching of the ridge.

The use of an adiabatic transition in the transition region (area Z7) is advantageous because the insertion losses of the resulting DOS must be less than the losses due to a non-adiabatic transition (not shown). One embodiment of the invention comprises a non-adiabatic transition of this kind, so that said first part of the output waveguide has a refractive index $n_1$ and said second part of the output waveguide has a refractive index $n_2 > n_1$, so that confinement is stronger in this second part, and said first and second parts are butt-jointed to cause a sudden index step in the transition region.

The refractive index step or the transition between said low confinement first part and said high confinement second part can therefore be adiabatic or non-adiabatic and over a greater or lesser length in the light propagation direction.

A transition of this kind can be achieved by any means known to the person skilled in the art, a few examples of which will be mentioned to illustrate a few embodiments of the invention.

The index step mentioned above can be obtained, for example, by using different materials in the two parts of the output waveguide or different dopants or different concentrations of dopants or crystalline or amorphous defects of the waveguides, possibly caused by ionic bombardment or ultraviolet radiation or otherwise. All these techniques are known to the person skilled in the art and enable adiabatic or non-adiabatic transitions to be implemented in accordance with the designs of the manufacturer.

FIG. 3 shows a transition region (Z7) between two optical waveguides respectively forming said first and said second output waveguide parts, all these waveguides being formed by the ridge technique. Similarly, it is feasible to effect a similar transition between waveguides formed by the buried heterostructure technique in a different embodiment of the invention (not shown).

Figure 4:
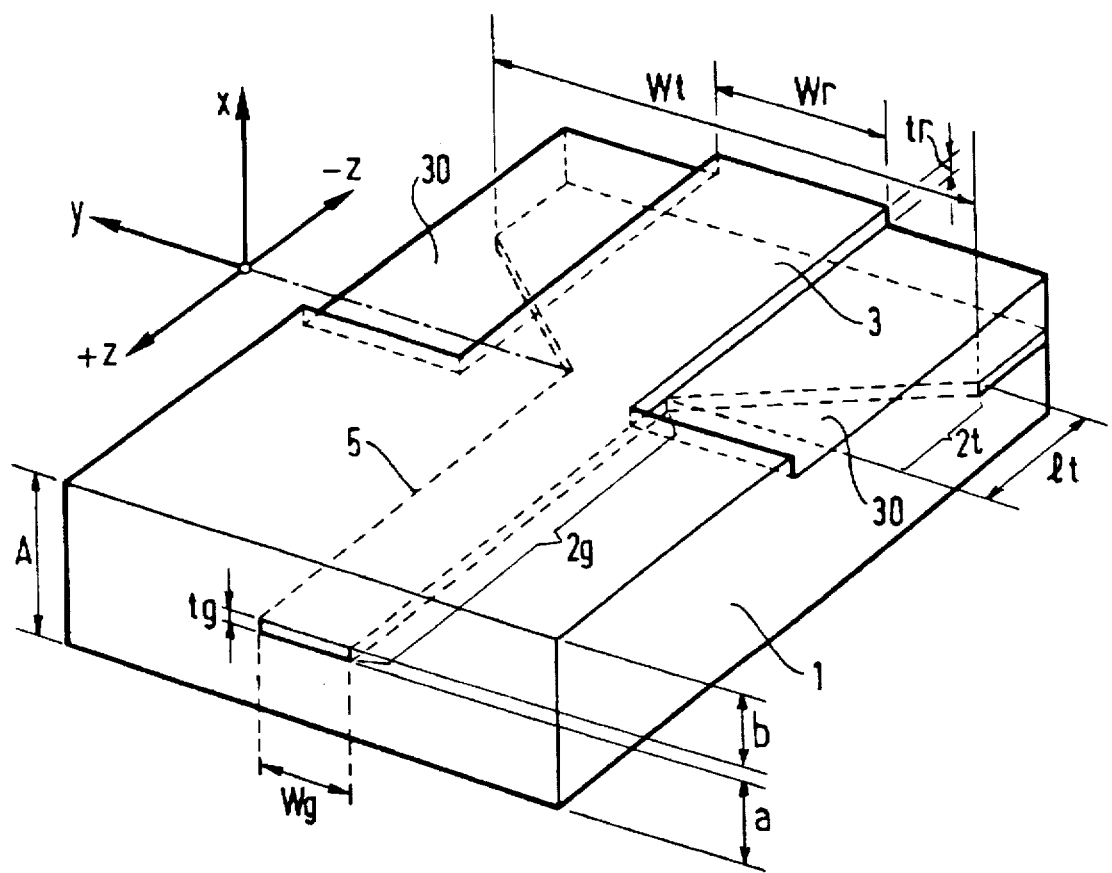
FIG. 4 shows one embodiment of an adiabatic transition between a buried heterostructure type waveguide and a ridge type waveguide as described in U.S. patent application Ser. No. 08/378,278 now U.S. Pat. No. 5,659,646, usable in the implementation of a switch in accordance with the invention.

In a further embodiment of the invention there is an adiabatic transition between a ridge optical waveguide and a buried heterostructure optical waveguide which respectively represent said first and second parts of said output waveguides of the DOS of the invention. A transition of this kind is shown in FIG. 4 and its implementation is described in more detail in U.S. patent application Ser. No. 08/378,278 now U.S. Pat. No. 5,659,646.

FIG. 4 is a diagrammatic and largely transparent representation of one embodiment of an adiabatic transition between a ridge guide structure and a buried heterostructure guide structure.

A guide layer 5 is deposited on a substrate 1 of thickness a by the standard techniques for epitaxial growth of thin layers, as routinely applied to the implementation of electronic or opto-electronic components. The substrate 1 is a semiconductor substrate having the qualities required for implementation of the intended opto-electronic circuit. In the current state of the art, and as described in "L'optique intégrée dans les matériaux semiconducteurs III–V" ("Integrated optics in III–V semiconductor materials"), A. Carenco et al., L'Echo des Recherches, no. 137, 1989, the substrate is a III–V substance, for example, such as $Al_xGa_{1-x}As$ on GaAs (with x<1) or InP; current research is investigating the use of Si as a substrate for such circuits. The guide layer 5 is GaAs (on an AlGaAs substrate), for example, or $In_{1-x}Ga_xAs_yP_{1-y}$ or $In_{1-x-y}Ga_xAl_yAs$ on an InP substrate (x<1, y<1). The III–V substances are regarded as promising for opto-electronic integrated circuits of this kind since their forbidden band corresponds to the wavelengths routinely used in active opto-electronic components (lasers, light-emitting diodes, etc) and passive opto-electronic components (optical waveguides, optical fibers, etc), and because purely electronic components can also be fabricated from these substances on the same substrate.

The figure shows only that part of the substrate carrying the transition, but the substrate extends over a much larger area in the y-z plane and can incorporate many optical, electronic and electro-optical components. Said guide layer has a thickness $t_g$. Conventional etching techniques are used to ablate areas on each side to define a guide structure 5 having a width $w_g$ in a guided propagation area $2_g$ (that will subsequently form a buried heterostructure waveguide) and a varying width in a transition area $2_t$ that will have a length $l_t$ in the propagation direction z. With this design, the width of the guide structure varies in the transition area $2_t$ between the width $w_g$ of the buried heterostructure waveguide and the final width $w_f$ of the transition. An advantageous feature of the invention is that this variation in width is adiabatic.

The figure shows one or more epitaxial layers having a total thickness b deposited onto the FIG. 1A guide structure using the conventional techniques known to the person skilled in the art. The total thickness A of the device therefore comprises the thickness a of the substrate 1, the thickness $t_g$ of the buried heterostructure waveguide and the thickness b of the upper layer(s).

Again using conventional techniques familiar to the person skilled in the art, the top layer is then etched to a depth $t_r$ to form a ridge optical waveguide 3 by ablution of areas 30 on either side of said ridge waveguide 3. The start of the ridge waveguide 3 is therefore superposed on the varying width transition area $2_t$ of the buried heterostructure guide structure.

The view shown in FIG. 4 is instructive in that it shows the spatial relationship between the lateral cladding structures (+/−y) of the guided wave in a preferred propagation direction (+/−z). The "core" or the guide layer remains the same before, during and after the transition in waveguides of the invention. Only the lateral cladding structure changes at the propagation mode transition. In the +z region, lateral cladding is provided by the width $w_g$ of the guide layer. In the −z region, lateral cladding is provided by the width $w_g$ of the optical waveguide formed by the ridge 3 and the guide layer, which widens in the direction −z in the transition area of length $l_t$.

There follows one non-limiting example of the FIG. 4 embodiment of the device, specifying the dimensions of the layers and guide structures and the materials employed. For example, for an optical waveguide transition to operate at a wavelength λ of 1.55 microns (μm), the device of FIG. 4 can be implemented on an InP substrate with the guide layer and the buried heterostructure 5 made from a quaternary substance $In_{1-x}Ga_xAs_yP_{1-y}$.

The parameter y, which determines the forbidden band of the quaternary material, is chosen according to the wavelength λ of the light to be conveyed in the waveguide. The parameter y determines the cut-off frequency of the waveguide and therefore the minimal wavelength $\lambda_g$ that can propagate in the guide. For $\lambda-\lambda_g$, the light is absorbed while for $\lambda>\lambda_g$ the material is transparent. In the example chosen, to operate at λ=1.55 μm, a value can be chosen such that $\lambda_g$=1.3 μm, which can be achieved with y=0.62, approximately; to obtain λ=1.5 μm, it is necessary to use y=0.89, approximately. The parameter x is then chosen so that the lattice matches the substrate, in accordance with rules familiar to the person skilled in the art. The "rule of thumb" is that x=y/2.197.

If a FIG. 4 implementation is chosen with $\lambda_g$=1.55 μm, the refractive index of the buried waveguide will be in the order of n=3.57. In this case, lateral cladding can be provided by a waveguide having a width $w_g$=2 μm with an $In_{1-x}Ga_xAs_yP_{1-y}$ guide layer approximately 0.1 μm thick. A layer of InP is then deposited onto the buried heterostructure and lateral cladding is provided by the optical index step between the $In_{1-x}Ga_xAs_yP_{1-y}$ and the InP surrounding it.

The ridge is formed in an InP top epitaxial layer a few microns above the guide layer, in the transition area. This structure achieves lateral cladding of the guided wave during and after the widening of the guide layer in the transition area. To form this structure an etch removes a depth $t_r$ of 1.5 μm on each side of the ridge structure 3, which will have a width of about 4 μm, for example.

FIGS. 5A through 5J show a few steps of a method for implementing a transition between a buried heterostructure type waveguide and a ridge type waveguide as described in U.S. patent application Ser. No. 08/513,185 and usable to form a transition for implementing a switch of the invention. This method is a so-called self-aligning method, which means that the positions and the orientations of the buried heterostructure and the ridge are obtained from a common mask during the etch that forms the delimiter strip.

Figure 5A:
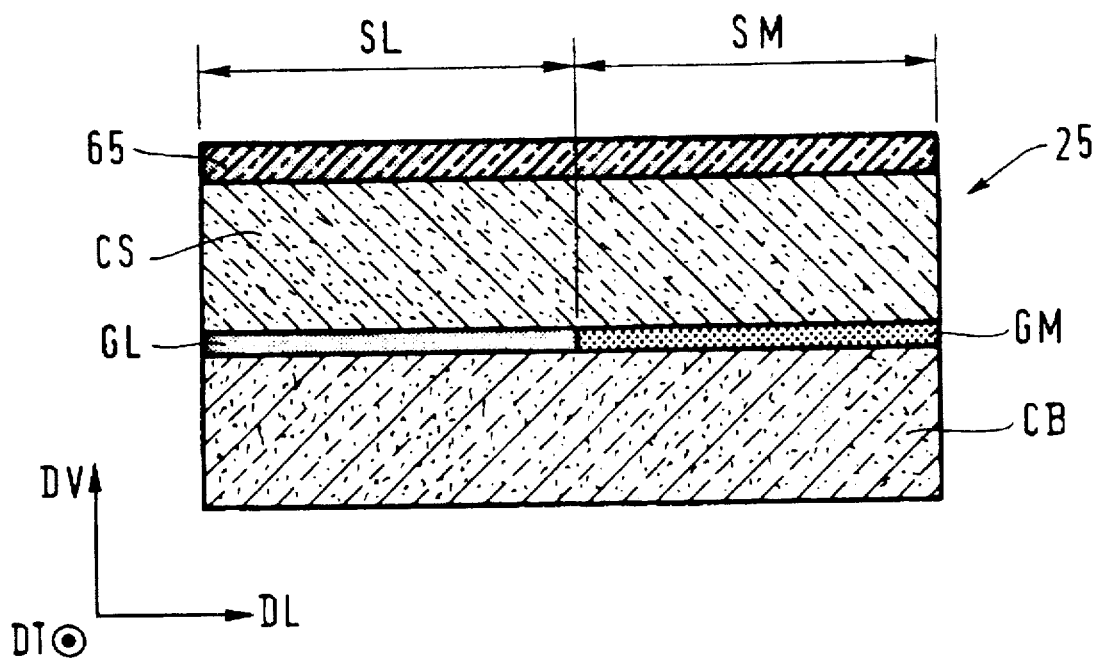
FIGS. 5A through 5J show various steps in the implementation of a transition between a buried heterostructure type waveguide and a ridge type waveguide as described in U.S. patent application Ser. No. 08/513,185 that can be used to implement a transition for implementing a switch in accordance with the invention.

FIG. 5A is a view in longitudinal section of a semiconductor wafer in which a buried heterostructure and a ridge must be formed.

Figure 5B:
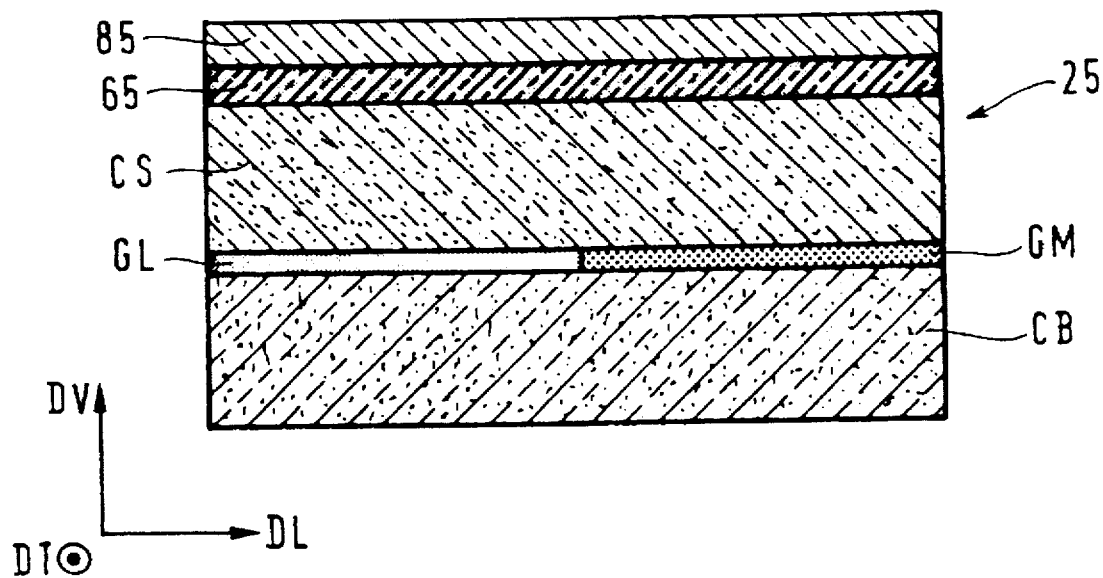

FIG. 5B shows this wafer in longitudinal section after depositing a delimiter layer.

Figure 5C:
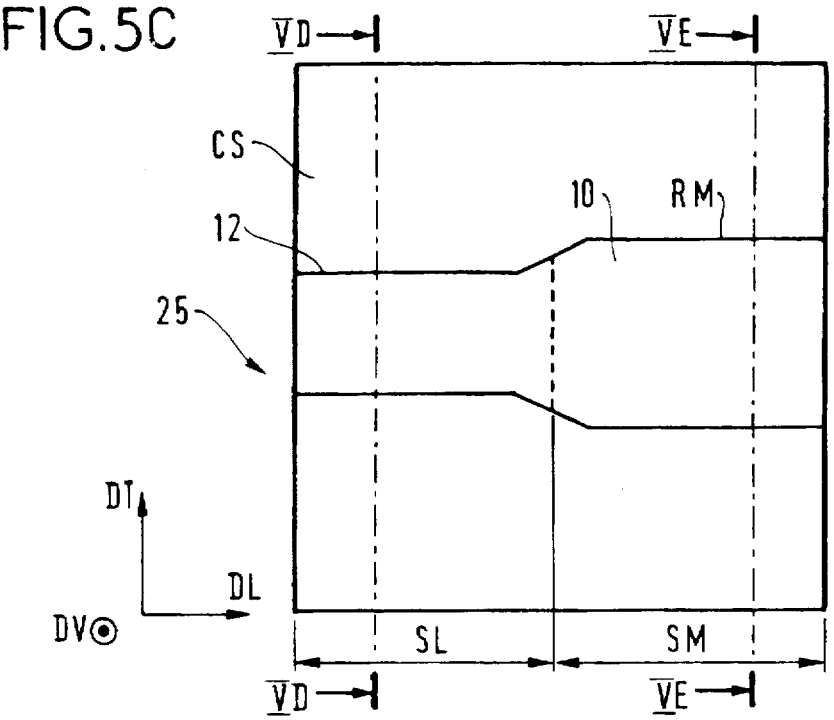

FIG. 5C is a top view of the wafer after etching the delimiter layer and a first step of etching the wafer.

Figure 5D:
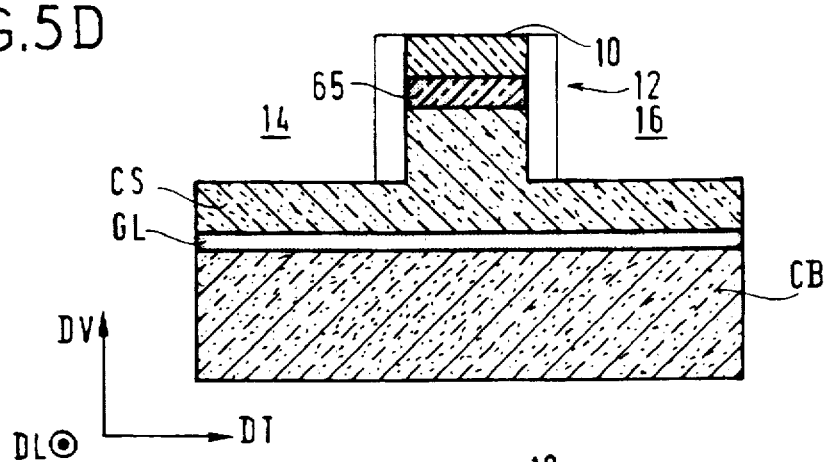
Figure 5E:
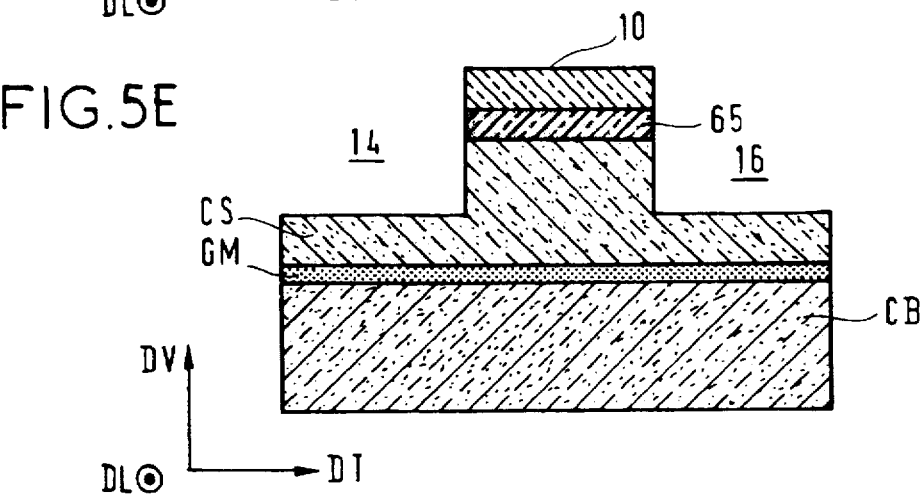

FIGS. 5D and 5E show the wafer in section on transverse planes IV—IV and V—V in FIG. 5C after this first etch.

Figure 5F:
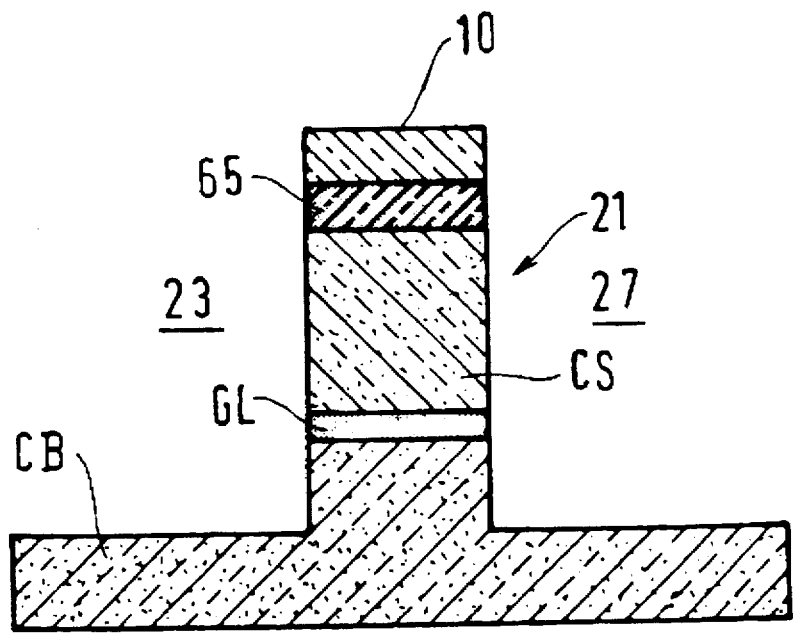
Figure 5G:
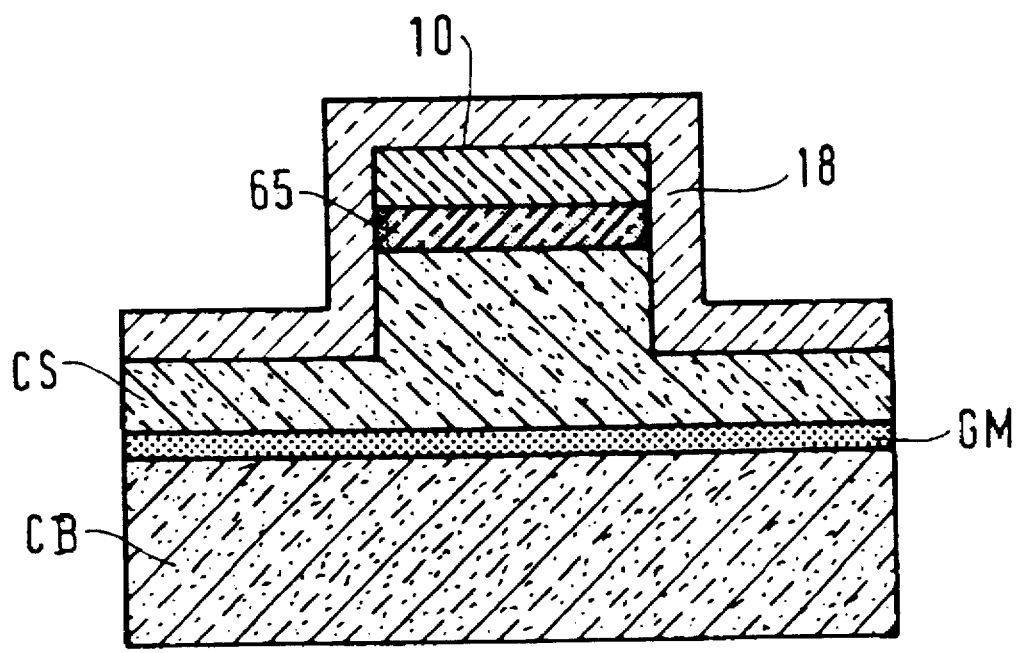

FIGS. 5F and 5G show the wafer in section on the same two transverse planes after a second etch.

Figure 5H:
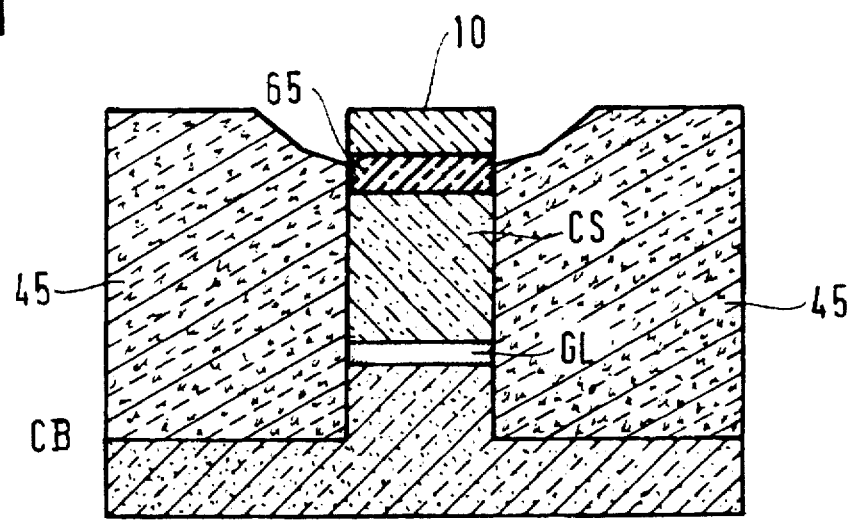

FIG. 5H shows the wafer in section on the transverse plane IV—IV after infilling of lateral recesses.

Figure 5I:
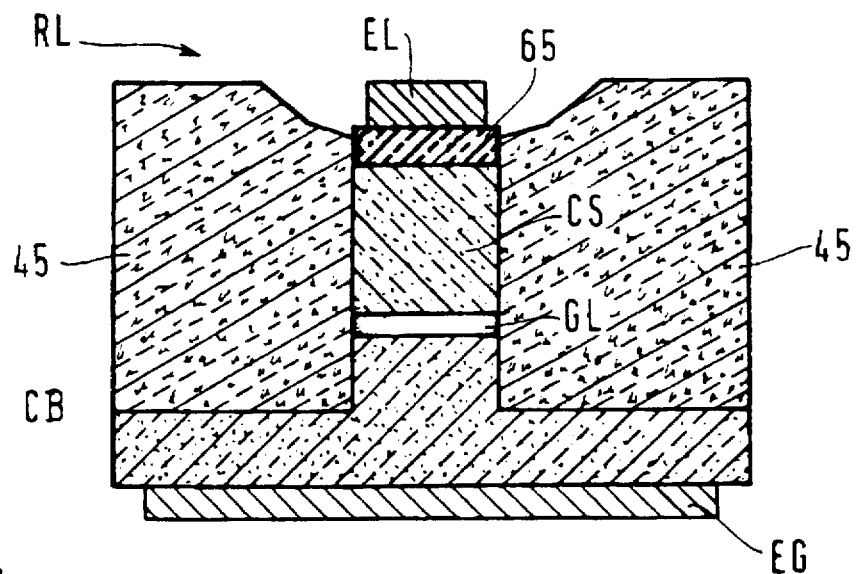
Figure 5J:
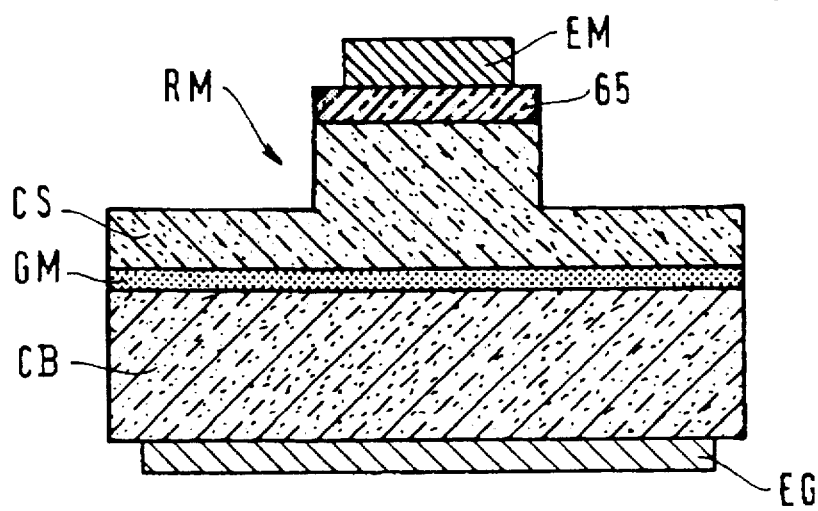

FIGS. 5I and 5J show the wafer in section on the same transverse planes after the formation of electrodes.

As shown in these figures, a component to be fabricated includes a semiconductor wafer 25 formed of layers extending in a longitudinal direction DL and a transverse direction DT and stacked in a vertical direction DV. These directions are defined relative to this wafer. This wafer includes a buried heterostructure segment SL and a ridge segment SM extending in succession along the longitudinal direction and respectively including a buried heterostructure RL and a ridge RM. The buried heterostructure and the ridge are shown in FIGS. 5I and 5J. They are aligned with each other along the direction DL.

Each includes an increased index layer GL or GM between a bottom cladding layer CB and a top cladding layer CH. The increased index referred to here is a refractive index and it is increased relative to that of the cladding layers so as to limit the vertical extent of a guided mode with which an optical wave propagates longitudinally in the buried heterostructure and in the ridge.

The increased index layer GL and the top cladding layer CH of the buried heterostructure RL are limited transversely between two lateral cladding blocks 45 that form part of the wafer 25. These blocks have a refractive index lower than said increased index so that this transverse limitation of the increased index layer limits the transverse extent of the mode guided by the buried heterostructure. They are further adapted to confine within the buried heterostructure a supply current flowing vertically in the wafer. This can be achieved in a manner that is known in itself by increasing the electrical resistivity of a constituent material of these blocks and/or by forming a blocking semiconductor junction in these blocks.

The top cladding layer CH of the ridge RM has a refractive index higher than that of a space, for example a gas, outside the wafer. It is limited transversely between two recesses 14 and 16 in the wafer forming part of this exterior space and leaving the increased index layer GM and the bottom cladding layer CB. This transverse limitation of the top cladding layer limits the transverse extent of the mode guided by the ridge.

All these layers are deposited epitaxially on a substrate that is not shown. This substrate and the bottom cladding layer are of the n type, for example. The top cladding layer CH is of the p type, for example, as is a strongly doped contact layer 65 deposited on top of the cladding layer.

The component to be fabricated also includes electrodes EL, EM and EG formed on top of and on the bottom of the wafer in each of the segments. To be more precise, the electrodes EL and EM are respectively formed on the buried heterostructure RL and on the ridge RM and the bottom electrode EG is common to the two segments.

The method of fabricating this component includes the following operations known in themselves to form the ridge RM:

depositing the bottom cladding layer CB, the increased index layer GL, GM, the top cladding layer CH and a delimiter layer 85 shown in FIG. 5B on top of the cladding layer in both segments, etching this delimiter layer to form in the ridge segment SM a delimiter strip 10 registering transversely with the ridge RM to be formed, and etching the wafer using an etching medium that does not etch the delimiter strip 10. The etch is stopped short of the increased index layer GL, GM. It produces two initial lateral recesses 14 and 16 shown in FIG. 5E and situated one on each side of the ridge RM. This etch is referred to hereinafter as the first etch.

The process naturally also includes operations to form a buried heterostructure and the electrodes.

In the prior art butt-jointing method, the ridge of one segment is formed first, after which the wafer is etched in the other segment down to the bottom cladding layer, after which a semiconductor structure is formed again in this other segment by successive selective epitaxial deposits, after which the ridge of this other segment is formed by an appropriate etch.

In this embodiment the etching of the delimiter layer also forms the delimiter strip 10 in the buried heterostructure segment SL, this strip registering transversely with the buried heterostructure RL to be formed. As a result, the first etch subsequently uncovers in this first segment a buried heterostructure precursor 12. This precursor is shown in FIG. 5D. It projects between the two initial lateral recesses 14 and 16 which do not extend as deep as the increased index layer GL.

In this example, the method then includes the following operations to form the buried heterostructure:

Depositing a protective layer 18 in both segments SL and SM.

Etching this protective layer 18 so that it remains only in the ridge segment SM.

Etching the wafer using an etch medium that does not etch the protective layer. This second etch extends deeper than the increased index layer GL to uncover a buried heterostructure body 21 in the buried heterostructure segment SL. This body is shown in FIG. 5F. It projects between two deep lateral recesses 23 and 27.

Finally, selectively depositing at least one material 45 by a selective deposition method that is ineffective on the remaining parts of the delimiter layer 10 and the protective layer 18. This forms the lateral cladding blocks 45 by infilling said deep lateral recesses.

The delimiter layer 10 and the protective layer 18 are typically layers of dielectric material. The method then further includes an operation to eliminate at least some of the remaining parts of the delimiter and protective layers after depositing the lateral cladding material 45 and before forming the top electrodes EL and EM.

The cladding layers CB and CS are layers of indium phosphide InP, the increased index layer GL, GM of ternary or quaternary alloys such as GaInAs, GaInAs, the delimiter layer 10 of silicon nitride $Si_3N_4$ and the protective layer 18 of silica $SiO_2$, at least one lateral cladding layer 45 being semi-insulating indium phosphide, for example.

The method shown in FIGS. 5A through 5J can be summarized as follows: a delimiter strip delimiting the aligned buried heterostructure and ridge and adapted to resist etching is formed first by etching, after which a first etch uncovers the ridge and a buried heterostructure precursor, after which (after protection of the ridge) a second etch uncovers the buried heterostructure body, after which selective deposition produces the lateral cladding of the buried heterostructure.

Figure 6A:
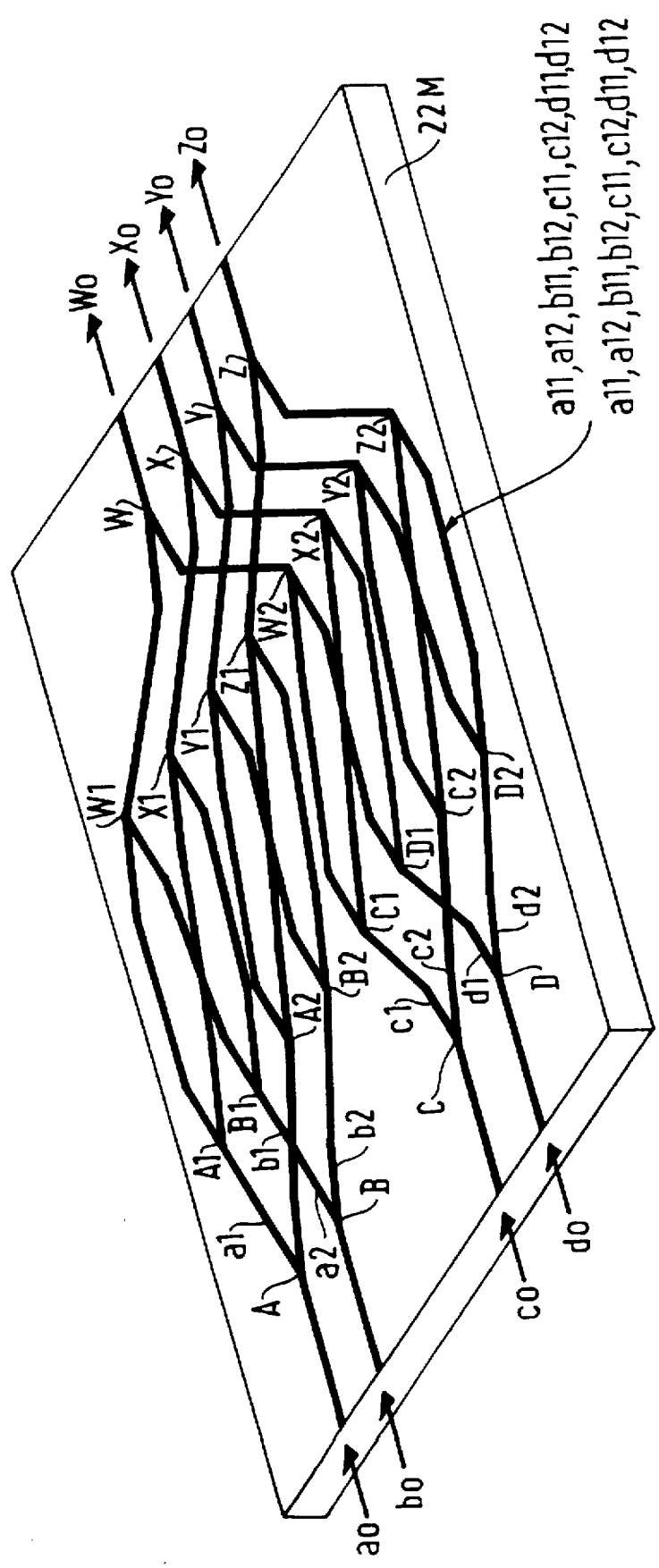
FIGS. 6A and 6B show a 4×4 switching matrix comprising a plurality of DOS of the invention (see FIG. 13, Vinchant et al. Proc. IEEE vol. J140, no. 5, p.306).

FIG. 6A shows one example of a 4×4 switching matrix comprising a plurality of DOS in accordance with the invention. 1×N, N×1, N×N and/or N×M switching matrices can be constructed in the same way.

Because of the tree architecture of such matrices, as shown in FIG. 6A, various switching functions can be obtained for the purposes of photonic routing. In a point-to-point connection the matrix is non-blocking.

In cross-connect applications, because the unbiased DOS behaves as a 3 dB coupler, the matrix can be used for point-to-multipoint routing (broadcasting). In the opposite propagation direction the unbiased DOS behaves as a passive combiner which usefully enables the implementation of applications at multiple wavelengths (wavelength-division multiplexing–WDM).

Figure 6B:
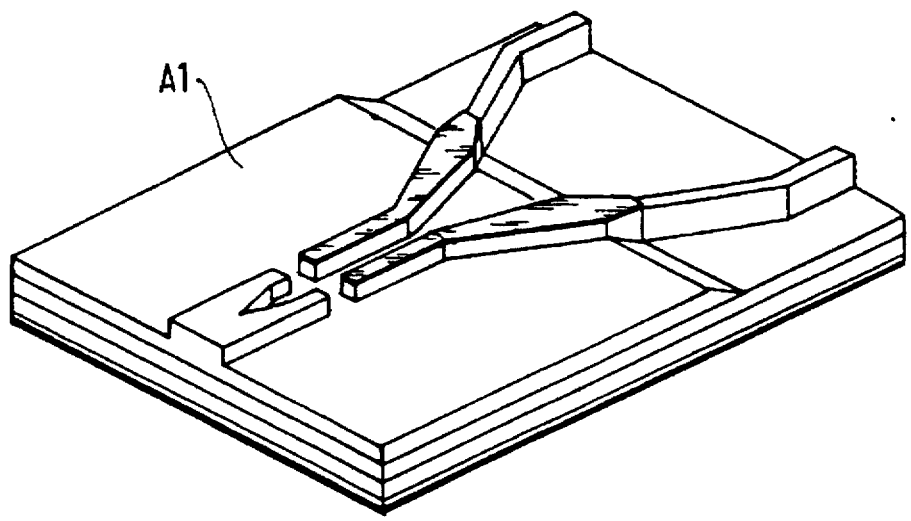

FIG. 6A shows four input optical waveguides a0, b0, c0, d0 and four output waveguide w0, x0, y0, z0 on a substrate 22M, for example an InP substrate. The four input waveguides include a first row of four switches A, B, C, D in accordance with the invention, one example of which is shown in FIG. 6B; each has two outputs a1, a2; b1, b2; c1, c2; d1, d2, respectively. These eight outputs are connected to respective inputs of a second row of DOS in accordance with the invention (A1, A2, B1, B2, C1, C2, D1, D2). The crossing over of the waveguides seen in the figure does not imply any interaction between the light signals propagating in the waveguides as there is no coupling between the waveguides where they cross over.

The third and fourth rows of DOS have two inputs and a single output. The switch selects the input from which the signal is routed to the single output.

The 16 outputs (a11, a12, a21, a22, b11, b12, b21, b22, c11, c12, c21, c22, d11, d12, d21, d22) of this second row of switches (A1, A2, B1, B2, C1, C2, D1, D2) are therefore connected, after crossing over, to the 16 inputs (w11, w12, w21, w22, x11, x12, x21, x22, y11, y12, y21, y22, z11, z12, z21, z22) of the third row of switches (W1, W2, X1, X2, Y1, Y2, Z1, Z2 , the eight outputs of which (w1, w2, x1, x2, y1, y2, z1, z2) are connected after crossing over to the eight inputs of the fourth row of switches (W0, X0, Y0, Z0), which in turn provides the four outputs of the switching matrix (w0, x0, y0, z0, respectively).

Using this arrangement, the person skilled in the art will realise that it is possible to connect any input to any output by applying a set of routing commands to a switch of each row of switches. An interconnection based on integrated mirrors can be used instead (see "New compact polarization insensitive 4×4 switch matrix on InP with DOS and integrated mirrors", J. F. Vinchant et al., ECOC'93, Montreux, Switz. Post deadline THC 12.4 Sep. 14, 1994–Sep. 16, 1993.

Figure 7:
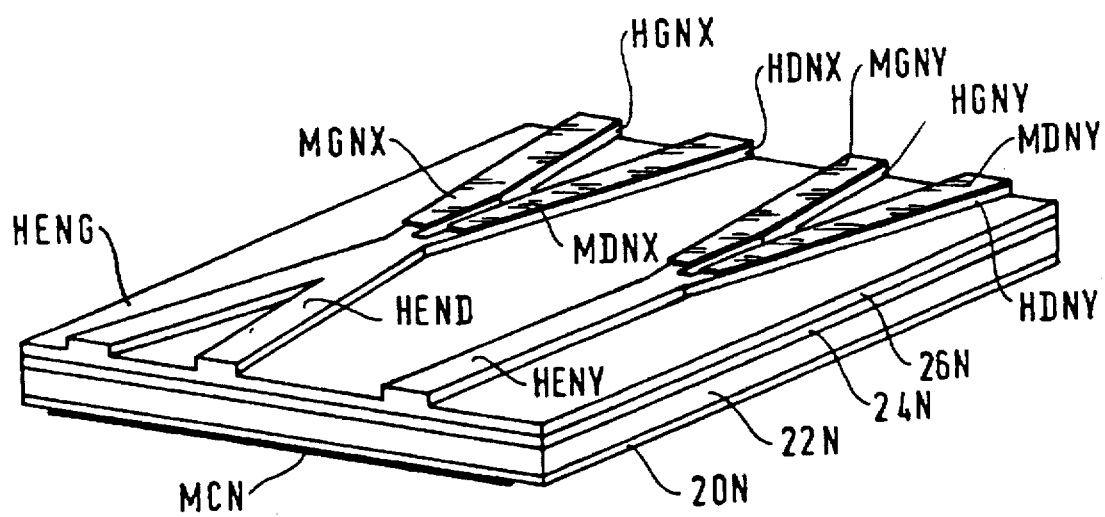
FIG. 7 shows a prior art DOS in the shape of the letter "X" instead of the letter "Y" (see "Large-angle 1.3 μm InP/InGaAsP digital optical switches with extinction ratios exceeding 20 dB", Nelson, W. H. et al., Proc. Optical Fiber Conference 1994, session TuM2, p53–54).

FIG. 7 shows an embodiment of a DOS in the shape of the letter "X" rather than the letter "Y", the latter also being shown in this figure. The output waveguides (HGNX, HDNX, HGNY, HDNY) and the control electrodes (MDNX, MGNX, MDNY, MGNY) are identical in both cases but the "X" shape DOS has two inputs (HENG, HEND) rather than one (HENY) in the case of a "Y" shape DOS.

For simplicity, FIG. 7 shows prior art DOS which do not have the features of the present invention. The person skilled in the art will realise that a DOS in the shape of the letter "X" as shown in FIG. 8 can be made in accordance with the invention in the same manner as previously described for the "Y" shape DOS. As in the above description of FIG. 3, the common components have the same reference symbols as in FIGS. 1 and 2, followed by the letter "N".

Given the horizontal disposition of the DOS in this figure, the DOS includes a vertical succession of horizontal layers comprising:

a bottom contact layer P20 in contact with a common electrode NMC;

a substrate 22N;

a guide layer 24N;

a cladding layer 26N.

In the FIG. 7 embodiment, the various common components listed above have the same functions as in the prior art DOS shown in FIGS. 1 and 2. Also, their main features are similar if not identical, in particular their implementation, their composition, their doping and their relative refractive indices. The geometrical parameters are the same and are therefore not shown in FIG. 7, but the values of these parameters are not necessarily the same.

The person skilled in the art will realise the utility of having "X" and "Y" shape DOS as this provides greater freedom in the design of a switching matrix for photonic routing, and in particular N×N matrices where N is even but N is not equal to a power of 2: $N \approx 2^P$.

Good performance has been reported for prior art "X" shape DOS, namely an increased extinction ratio compared to "Y" shape DOS (see "Large angle 1.3 µm InP/inGaAsP digital optical switches with extinction ratios exceeding 20 dB", Nelson W. H. et al., Optical Fiber Conference OFC'94 Technical Digest, paper TuM2, p53

The above detailed description covers a few non-limiting embodiments of the invention and its main variants in order to illustrate the general principles of the invention. The person skilled in the art will know how to apply the teaching of the invention in many other implementations not described here but conforming to the principles of the invention and falling within the scope of the following claims.

There is claimed:

1. Digital optical switch comprising two input optical waveguides and first and second output optical waveguides, said waveguides being mutually disposed at a crossover having the shape of the letter "X", said first and second output waveguides each comprising at least a first part at one end of said input waveguide and a second part at one end of said first part, said first and second parts being coupled by a transition in a transition region, and means for applying an electrical control signal that commands a refractive index difference between said respective first parts of said first and second output waveguides, wherein at least one of said output optical waveguides has in a plane containing said output waveguides a guided propagation mode width that is lower in said second part than the mode width in said first part of the respective output waveguide.

2. Digital optical switch comprising an input optical waveguide and first and second output optical waveguides, said waveguides being mutually disposed at a bifurcation having the shape of the letter "Y", said first and second output waveguides each comprising at least a first part at one end of said input waveguide and a second part at one end of said first part, said first and second parts being coupled by a transition in a transition region, and means for applying an electrical control signal that commands a refractive index difference between said respective first parts of said first and second output waveguides, wherein at least one of said output optical waveguides has in a plane containing said output waveguides a guided propagation mode width that is lower in said second part than the mode width in said first part of the respective output waveguide.

3. Digital optical switch according to claim 2 wherein said transition is an adiabatic transition.

4. Digital optical switch according to claim 5 wherein said adiabatic transition is formed by etching.

5. Digital optical switch according to claim 4 wherein the depth of said etching is greater in the region of said second part than in the region of said first part of said output waveguides.

6. Digital optical switch according to claim 3 wherein said adiabatic transition is between said first parts formed by a ridge technique and said second parts formed by a buried heterostructure technique.

7. Digital optical switch according to claim 3 wherein said adiabatic transition is between said first and second parts both formed by a buried heterostructure technique.

8. Digital optical switch according to claim 2 wherein said first and second parts have respective physical dimensions transverse to the direction of propagation of light in said waveguides referred to as their height and their width and wherein said height of said first parts is less than said height of said second parts.

9. Digital optical switch according to claim 8 wherein said width of said second parts is less than said width of said first parts.

10. Digital optical switch according to claim 2 wherein said transition is between a first part having a refractive index $n_1$ and a second part having a refractive index $n_2 > n_1$.

11. Digital optical switch according to claim 10 wherein said transition between said first and second parts with indices $n_1$, $n_2$ is produced by a butt joint.

12. Digital optical switch according to claim 2 wherein at least said first parts are formed by a multiple quantum well technique.

13. A plurality of digital optical switches according to claim 2 interconnected to constitute a switching matrix.

* * * * *